United States Patent Office 3,015,368
Patented Jan. 2, 1962

3,015,368
TREATMENT OF DESICCANTS
Luther J. Reid, Woodbury, N.J., assignor to Socony Mobil Oil Company, Inc., a corporation of New York
No Drawing. Filed Mar. 16, 1960, Ser. No. 15,269
6 Claims. (Cl. 183—114.2)

This invention relates to a method for treating a solid porous siliceous desiccant to inhibit fouling thereof during use as a medium for drying a moisture-containing hydrocarbon. More particularly, the present invention is concerned with a method for reducing the rate of decline in adsorptive capacity, when employed in the drying of moist hydrocarbons, of a solid porous siliceous gel desiccant, having the inherent ability to catalytically convert fluid hydrocarbons under the conditions of desiccation and subsequent regeneration to solid carbonaceous bodies.

As is well known, gas and non-aqueous liquids are frequently dried by bringing the same into contact with a solid desiccant, such as for example by passing a stream thereof through a column packed with a solid particle-form siliceous adsorbent. When water in the effluent resulting from such contact exceeds the desired concentration, the desiccant is regenerated by heating to an elevated temperature generally exceeding about 250° F. and which may extend up to approximately 650° F. After regeneration, the desiccant is re-used for further drying.

One class of solid desiccants which have been widely employed are those having silica as a major component. These desiccants generally in the form of siliceous gels often suitably contain a small amount of metal oxide, such as alumina, zirconia, magnesia and the like. Large amounts of such metal oxides have been reported to reduce desiccating capacity of the resultant gel product. Accordingly, the metal oxide content of siliceous gel adsorbent has generally been controlled so as not to exceed more than about 3 percent by weight of the solid desiccant product. The inclusion of such small amount of metal oxide in the siliceous gel desiccant has been found to be particularly desirable when the latter is prepared in the form of spheroidal particles. As described in U.S. Patent 2,462,798 to Wilson, the introduction of a small amount of certain metal oxides into the siliceous desiccant bead hydrogel serves to effectively reduce breakage of the same during the subsequent drying step employed in their production.

The resulting siliceous desiccants are inherently characterized by the ability to catalytically convert fluid hydrocarbons to solid carbonaceous material under the elevated temperature conditions employed for regeneration thereof. Thus, the above-described siliceous desiccants behave as catalysts in reactions such as hydrocarbon cracking and polymerization which give rise to the production of a highly carbonaceous non-volatile material commonly referred to as coke.

Accordingly, when hydrocarbon materials, for example natural gas, are passed over such adsorbents, as is done in effecting removal of moisture therefrom, a hydrocarbon fraction particularly the heavier hydrocarbons, are adsorbed and are not removed from the adsorbent before regeneration. During regeneration under conditions of elevated temperature, it has been observed that black carbonaceous deposits attributable to catalytic conversion and, particularly, cracking and polymerization of the adsorbed hydrocarbon component, form on the siliceous desiccant. The cumulative building up of these deposits results in fouling of the desiccant with an accompanying marked decline in adsorptive capacity thereof.

The principal object of this invention is to reduce the rate of decline in adsorptive capacity of the hereinabove described siliceous gel desiccants by inhibiting the extent of fouling that occurs during adsorption and regeneration in the presence of hydrocarbon materials.

The above and other objects which will be apparent to those skilled in the art are realized in accordance with the present invention. It has been discovered that the above-described tendency of the siliceous desiccant to foul when utilized in drying hydrocarbons can be greatly reduced by treating the same, prior to contact with the hydrocarbon charge, with an aliphatic amine for a period of time sufficent to overcome the fouling tendencies and generally for a period within the approximate range of 1 to 20 hours. Contact between the desiccant undergoing treatment and the aliphatic amine is ordinarily performed at room temperature but may take place within the approximate temperature range of 60° F. to 200° F.

The aliphatic amine employed may be a tertiary, secondary, or primary amine or mixtures thereof. The low molecular weight aliphatic amines are gaseous, while the heavier amines of this group are liquids or solids. The latter heavier amines are suitably employed in the process of the invention in the form of solution in a suitable solvent. Particularly preferred are the water-soluble amines, which are adaptable for use in the form of aqueous solutions. The low molecular weight gaseous aliphatic amines may be employed directly in treatment of the desiccant or may be utilized after admixture with a diluent which may be an inert gas, for example nitrogen, or a suitable liquid solvent, such as water. These aliphatic amines characterized by low boiling point, i.e. generally not greater than about 200° F. may suitably be injected into the influent hydrocarbon stream to maintain a low degree of desiccant fouling. The most effective aliphatic amines are the tertiary amines such as trimethyl amine, triethyl amine, tributyl amine, tripropyl amine and similar tertiary amines which may have identical or dissimilar alkyl or cycloalkyl groups. Suitable secondary aliphatic amines, include dicyclohexyl amine, dimethyl amine, methyl ethylamine, and diethyl amine. Suitable primary aliphatic amines include methyl amine, propyl amine, ethyl amine, butyl amine, amyl amines and benzyl amine. Suitable diamines are ethylene diamine, propyline amine and hexamethylene diamine.

The reason as to why the above aliphatic amines inhibit fouling of the specified siliceous desiccants is not clear. It would appear to reside at least in part in the ready adsorption of this class of compounds and their ability to possibly counteract acidic catalytic sites initiated in the siliceous desiccant by reason of the inclusion therein of metal oxide. However, in the latter regard it is of interest to note that ammonia as well as aromatic amines, such as quinoline, were ineffective in inhibiting fouling such as achieved with the aliphatic amines.

The desiccant undergoing treatment in accordance with the method described herein is a preformed porous solid consisting essentially of silica and containing not more than about 3 percent by weight of an oxide of a metal selected from group IIA, such as magnesium, IIIB, such as aluminum, or IVA, such as titanium and zirconium, of the periodic table. Representative siliceous desiccants of this class include those containing at least about 97 percent silica and not more than about 3 percent of a metal oxide such as alumina, zirconia, magnesia, etc., the resultant composite being characterized by the ability to catalytically crack fluid hydrocarbons to solid carbonaceous material when subjected to temperatures within the range employed for regeneration of the desiccant.

When the particles of desiccant are in the form of beads or of other uniform shape and an aqueous aliphatic amine solution is utilized as the treating medium, it is generally desirable to prevent breakage of the beads or other uniformly shaped particles upon contact with the aqueous treating solution by initially removing air contained in the pores of the desiccant before treatment by evacuating the same or by contact with water vapor or water-soluble gases utilizing the technique described in U.S. Patent 2,456,576 to Bodkin et al.

The following examples will serve to illustrate the method of the invention without limiting the same:

Example 1

Sixteen hundred (1600) grams of a gel desiccant in the form of spheroidal particles and containing 97 weight percent silica and 3 weight percent alumina were initially saturated with water vapor to prevent breakage upon subsequent contact with aqueous media and were thereafter covered with a 1 percent aqueous solution of trimethyl amine for 4 hours. The solution was drained and replaced with fresh solution every 4 hours. At the end of 16 hours the desiccant was washed with water until free of soluble matter and then dried at 250° F. and tempered at 400° F. in air.

The above treated desiccant was placed in one container and an equal amount of desiccant which had not been so treated was placed in another container. Each of the containers were then pressurized with ethylene to 1000 p.s.i.g., heated to 400° F. and the pressure maintained for 24 hours. The conversion of gaseous ethylene to oil is a direct indication of the fouling characteristics of the two desiccants. The greater the volume of oil formed, the greater the fouling tendency of the desiccant. The results are set forth below:

| | Vol. of Oil Collected, ml. | Color of Desiccant After Test |
|---|---|---|
| Silica-Alumina Gel Desiccant (97% SiO$_2$—3% Al$_2$O$_3$). | 218 | Black. |
| Silica-Alumina Gel Desiccant (97% SiO$_2$—3% Al$_2$O$_3$) Treated with Aqueous Trimethyl Amine. | 26 | Original Yellow Brown color. |

It is evident from the foregoing results that the fouling tendency of the desiccant, which had undergone prior treatment with trimethyl amine, has been greatly reduced.

It will be understood that the above description is merely illustrative of preferred embodiments of the invention, of which many variations may be made by those skilled in the art without departing from the spirit thereof.

I claim:

1. A method for inhibiting fouling of a solid porous siliceous desiccant consisting essentially of at least about 97 percent by weight silica and a small amount not exceeding about 3 percent by weight of an oxide of a metal selected from group IIA, IIIB and IVA of the periodic table, attributable to the accumulation therein of carbonaceous deposit resulting from catalytic conversion under conditions of elevated temperature of previous adsorbed hydrocarbon which comprises treating said desiccant prior to adsorption of said hydrocarbon with an aliphatic amine.

2. A method for inhibiting fouling of a solid porous desiccant consisting essentially of at least about 97 percent by weight silica and a small amount not exceeding about 3 percent by weight of an oxide of a metal selected from group IIA, IIIB and IVA of the periodic table, attributable to the accumulation therein of carbonaceous deposite resulting from catalytic conversion under conditions of elevated temperature of previous adsorbed hydrocarbon which comprises treating said desiccant prior to adsorption of said hydrocarbon with an aqueous solution of a water-soluble aliphatic amine.

3. A method for inhibiting fouling of a solid porous desiccant consisting essentially of at least about 97 percent by weight silica and a small amount not exceeding about 3 percent by weight of alumina, attributable to the accumulation therein of carbonaceous deposit resulting from catalytic conversion under conditions of elevated temperature of previous adsorbed hydrocarbon which comprises treating said desiccant prior to adsorption of said hydrocarbon with a tertiary aliphatic amine.

4. A method for inhibiting fouling of a solid porous desiccant consisting essentially of at least about 97 percent by weight silica and a small amount not exceeding about 3 percent by weight of alumina, attributable to the accumulation therein of carbonaceous deposit resulting from catalytic conversion under conditions of elevated temperature of previous adsorbed hydrocarbon which comprises treating said desiccant prior to adsorption of said hydrocarbon with trimethyl amine.

5. A method for reducing the rate of decline in adsorptive capacity of a solid porous siliceous gel desiccant consisting essentially of at least about 97 percent by weight silica and a small amount not exceeding about 3 percent by weight of alumina, having the inherent ability to catalytically polymerize a fluid hydrocarbon at a temperature in excess of 250° F., which comprises treating said desiccant prior to contact with said hydrocarbon with a tertiary aliphatic amine.

6. The method of claim 5 wherein the amine is trimethyl amine.

References Cited in the file of this patent
UNITED STATES PATENTS

| 2,930,447 | Barrer | Mar. 29, 1960 |
| 2,935,539 | Gladrow et al. | May 3, 1960 |

OTHER REFERENCES

"Crystalline Zeolites" I. The Properties of a New Synthetic Zeolite Type A by D. W. Breck et al., J. of A. Ch.S., vol. 78, December 8, 1956, No. 23, pages 5963–5971.

UNITED STATES PATENT OFFICE
CERTIFICATE OF CORRECTION

Patent No. 3,015,368 January 2, 1962

Luther J. Reid

It is hereby certified that error appears in the above numbered patent requiring correction and that the said Letters Patent should read as corrected below.

Column 2, line 22, for "solution" read -- solutions --; lines 42 and 43, for "propyline amine" read -- propylene diamine --.

Signed and sealed this 1st day of May 1962.

(SEAL)
Attest:

ERNEST W. SWIDER
Attesting Officer

DAVID L. LADD
Commissioner of Patents